US008826170B1

(12) United States Patent  
Weber et al.

(10) Patent No.: US 8,826,170 B1  
(45) Date of Patent: Sep. 2, 2014

(54) WINDOW SWITCHING INTERFACE

(71) Applicant: Google Inc., Mountain View, CA (US)

(72) Inventors: Arnaud Claude Weber, Saratoga, CA (US); Alex Neely Ainslie, San Francisco, CA (US); Roma Rajni Shah, San Francisco, CA (US); Angela Strange, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/890,209

(22) Filed: May 8, 2013

Related U.S. Application Data

(60) Provisional application No. 61/800,261, filed on Mar. 15, 2013.

(51) Int. Cl.  
 G06F 3/048 (2013.01)  
 G06F 3/0488 (2013.01)
(52) U.S. Cl.  
 CPC .................................. *G06F 3/0488* (2013.01)  
 USPC ........................................................ 715/777
(58) Field of Classification Search  
 USPC ......... 715/702, 718, 738, 739, 744–745, 763, 715/766, 767, 769, 778, 783, 789, 794, 795, 715/796, 797, 802, 804, 806, 807, 863, 864  
 See application file for complete search history.

(56) References Cited

U.S. PATENT DOCUMENTS

| | | |
|---|---|---|
| 2006/0041846 A1 | 2/2006 | Masselle et al. |
| 2006/0041847 A1 | 2/2006 | Maw |
| 2006/0161861 A1* | 7/2006 | Holecek et al. ............... 715/782 |
| 2008/0189645 A1* | 8/2008 | Kapanen et al. .............. 715/777 |
| 2009/0091542 A1* | 4/2009 | Inaba et al. ................... 345/173 |
| 2011/0041092 A1 | 2/2011 | Zhang |
| 2011/0209099 A1* | 8/2011 | Hinckley et al. ............. 715/863 |
| 2012/0131495 A1 | 5/2012 | Goossens et al. |
| 2013/0145290 A1 | 6/2013 | Weber et al. |

OTHER PUBLICATIONS

Linder, Brad, "Access launches NetFront Life suite of Android apps (browser, documents, home screen)," retrieved from <http://mobiputing.com/2010/11/access-launches-netfront-life-suite-of-android-browser-documents-home-screen>, Nov. 2010. 11 pages.

* cited by examiner

*Primary Examiner* — Enrique Iturralde  
(74) *Attorney, Agent, or Firm* — McDermott Will & Emery LLP

(57) ABSTRACT

Methods for switching between tabbed windows are provided. In one aspect, a method includes receiving an input of a touch gesture includes a dragging motion via a touch interface of a device, and determining whether the touch gesture begins within a predetermined distance from a first edge of the touch interface and proceeds towards a second edge of the touch interface. The method also includes providing at least one tabbed window in an application for display from a perspective vertically above the at least one tabbed window in response to determining that the touch gesture begins within the predetermined distance from the first edge and proceeds towards the second edge. Systems and machine-readable media are also provided.

16 Claims, 9 Drawing Sheets

WINDOW SWITCHING INTERFACE

CROSS-REFERENCE TO RELATED APPLICATIONS

The present application claims the benefit of priority under 35 U.S.C. §119 from U.S. Provisional Patent Application Ser. No. 61/800,261 entitled "Window Switching Interface," filed on Mar. 15, 2013, the disclosure of which is hereby incorporated by reference in its entirety for all purposes.

BACKGROUND

1. Field

The present disclosure generally relates to the transmission of data over a network, and more particularly to the use of a computing device to display data communicated over a network.

2. Description of the Related Art

Applications such as web browsers commonly provide multiple documents, such as web pages, for display in the application. Each document or web page is commonly displayed in a respective browsing window ("tabbed window" or "tab") of the application. In order for a user viewing a current tab to switch to another tab using a touch interface, such as a touchscreen tablet, the user commonly performs multiple steps that can be cumbersome. For instance, the user when viewing the current tab first identifies a destination tab to switch to by referring to a limited identifier space for the destination tab displaying an icon and a small portion of title text, and then the user moves their hand from a resting position (e.g., holding a side of the tablet) to pressing the limited identifier space of the destination tab. The destination tab is then displayed by the application, and the user confirms that the destination tab is the tab the user intended to select. If the destination tab is the correct intended tab, the user returns their hand to the resting position, otherwise the user repeats this process to select another tab.

SUMMARY

According to one embodiment of the present disclosure, a computer-implemented method for switching between tabbed windows is provided. The method includes receiving an input of a touch gesture includes a dragging motion via a touch interface of a device, and determining whether the touch gesture begins within a predetermined distance from a first edge of the touch interface and proceeds towards a second edge of the touch interface. The method also includes providing at least one tabbed window in an application for display from a perspective vertically above the at least one tabbed window in response to determining that the touch gesture begins within the predetermined distance from the first edge and proceeds towards the second edge.

According to another embodiment of the present disclosure, a system for switching between tabbed windows is provided. The system includes a memory that includes instructions, and a processor. The processor is configured to execute the instructions to receive an input of a touch gesture includes a dragging motion via a touch interface of a device, and determine whether the touch gesture begins within a predetermined distance from a first edge of the touch interface and proceeds towards a second edge of the touch interface. The processor is also configured to execute the instructions to provide a plurality of tabbed windows in an application for display from a perspective vertically above the plurality of tabbed windows in response to determining that the touch gesture begins within the predetermined distance from the first edge and proceeds towards the second edge. Each of the plurality of tabbed windows is configured to be provided for display at varying degrees with respect to the perspective vertically above the plurality of tabbed windows According to a further embodiment of the present disclosure, a machine-readable storage medium that includes machine-readable instructions for causing a processor to execute a method for switching between tabbed windows is provided. The method includes receiving an input of a touch gesture includes a dragging motion via a touch interface of a device when at least one tabbed window from among a plurality of tabbed windows is provided for display from a perspective in front of the at least one tabbed window, and determining whether the touch gesture begins within a predetermined distance from a first edge of the touch interface and proceeds towards a second edge of the touch interface. The method also includes providing the plurality of tabbed windows in a web browser for display from a perspective vertically above the plurality of tabbed windows, each of the plurality of tabbed windows being provided for display at varying degrees with respect to the perspective vertically above the plurality of tabbed windows in response to determining that the touch gesture begins within the predetermined distance from the first edge and proceeds towards the second edge. The touch interface includes at least one of a touchscreen or a touchpad.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides an interface for entering a tab switching mode in an application, such as a web browser, while the user maintains their hand in the resting position. Specifically, the user having their hand in the resting position holding the tablet may swipe their thumb or other finger from off of an edge (e.g., a lateral or vertical edge) of the touchscreen of the tablet (or touchpad of a device) onto the edge of the touchscreen in order to enter the tab switching mode. In certain aspects, if the swipe does not exceed a certain threshold distance, the tab switching mode is not entered.

The tab switching mode provides each open tab for display in a vertical (e.g., file cabinet or rolodex) arrangement such that the user can view each of the tabs and their related web page content from a perspective vertically above the tabs. In certain aspects, the tab that was being displayed in the web browser prior to entering the tab switching mode appears most prominent (e.g., having an increased distance from neighboring tabs) in the vertical arrangement. In order to make another tab more prominent, the user may use a multi-touch gesture on the other tab (e.g., a pinch or stretch input) to increase the visibility of the other tab (e.g., by creating additional space between the other tab and its neighboring tabs). The user may also physically rotate the tablet to increase a visibility of a tab using feedback from an accelerometer in the tablet. In certain aspects, each of the tabs can be displayed at the same or varying degrees in the vertical arrangement. For example, a tab displayed at zero degrees would appear flat, and a tab displayed at 90 degrees may not be visible.

Figure 1:
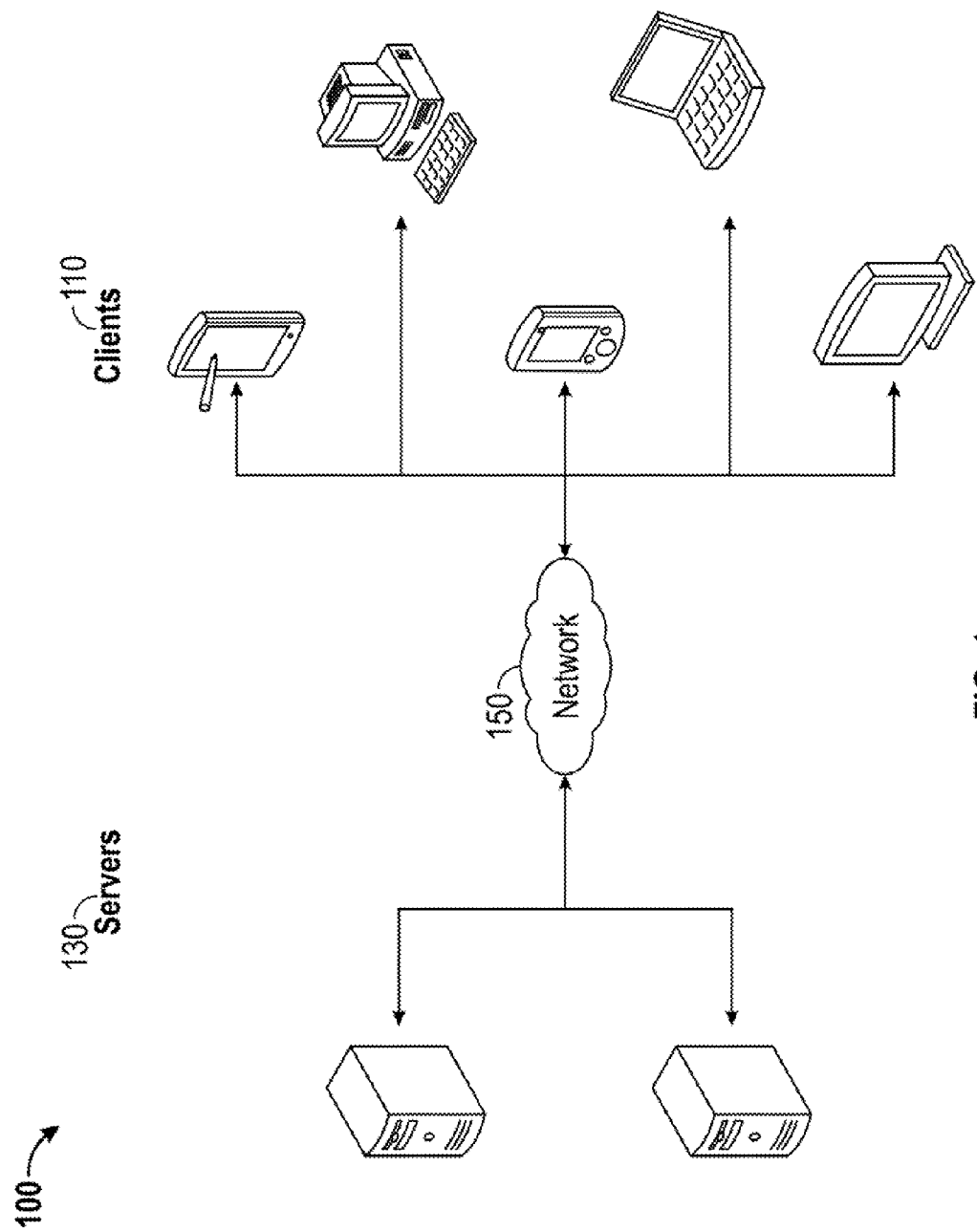
FIG. 1 illustrates an example architecture for switching between tabbed windows.

FIG. 1 illustrates an example architecture 100 for switching between tabbed windows. The architecture 100 includes servers 130 and clients 110 connected over a network 150.

Each of the clients 130 is configured to download, install, and run a graphical user interface application for displaying documents in tabs as disclosed herein. The graphical user interface application can be, for example, a web browser, document viewer, or content editor, and the documents can be, for example, web pages, text documents, images, or other displayable content. The application is configured to run on clients 130 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, touch input, and communications capabilities. In certain aspects, certain advantages of the application, such as less effort made by the user to switch tabs, are most salient on clients 110 that are touchscreen mobile devices (e.g., tablet computers or smartphones) or other touch-input devices that have limited display areas.

The application, once installed on a client 110, is configured to load documents for display. The documents can be loaded, for example, from any one or multiple client servers 130 hosting the documents (e.g., web servers). The servers 130 can be any device having an appropriate processor, memory, and communications capability for hosting the data for installing the web browser and for hosting the documents. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed application, once downloaded from a server 130 and installed and executed on a client 110, is configured to display tab indicators to represent opened document viewing windows, and enter a tab switching mode using a swiping touch input motion received from a user that starts near one edge of the touchscreen within the display of the web browser in the direction of another edge of the touchscreen. If the distance of the swiping touch input exceeds a threshold, then the tab switching mode is entered, otherwise the tab switching mode is not entered. Once the tab switching mode is entered, a user may exit the tab switching mode by selecting a tab to view in the application.

Figure 2:
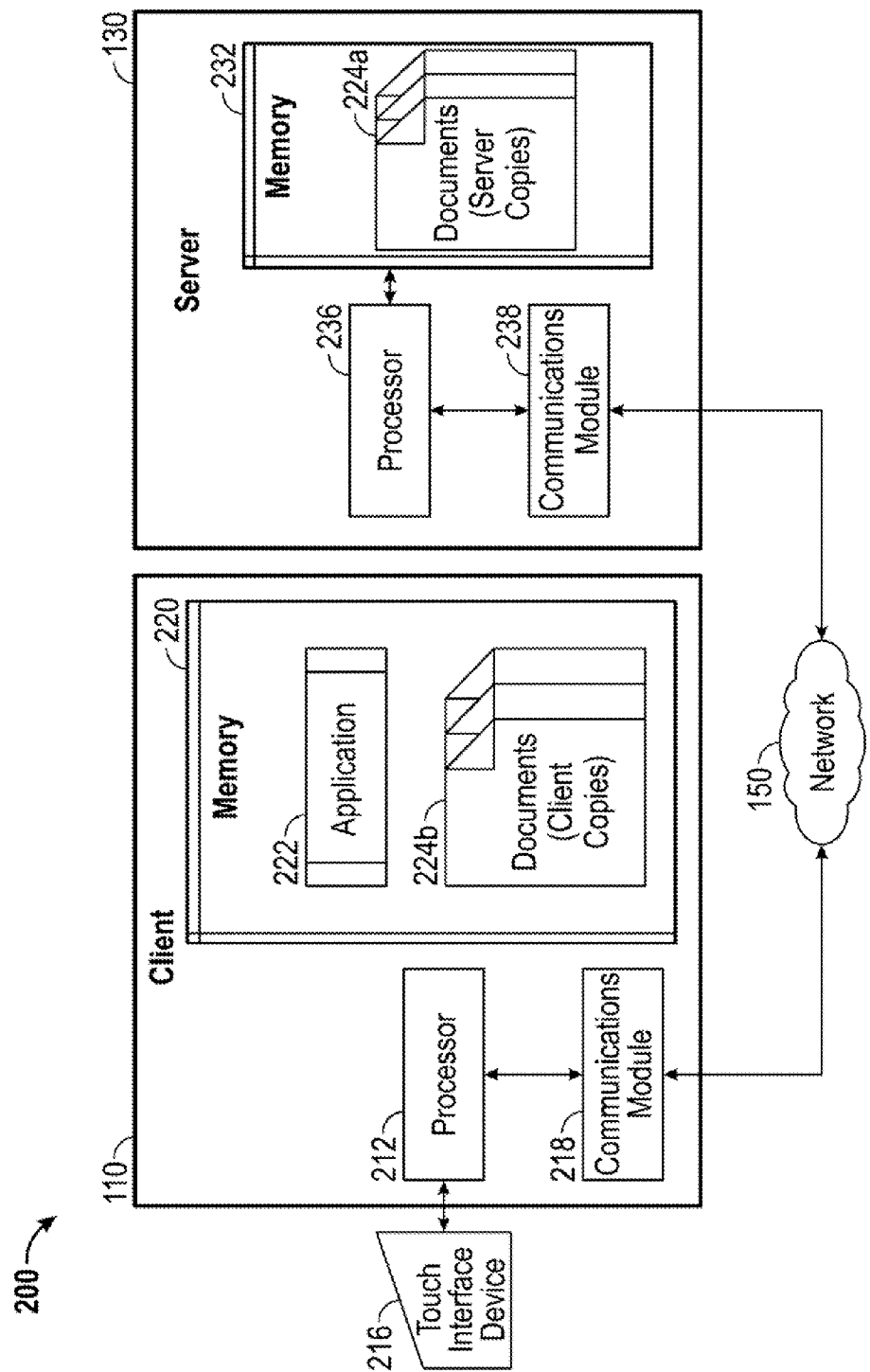
FIG. 2 is a block diagram illustrating an example client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220. The memory 220 includes an application 222 and a client copies of documents 224b to display in tabs in the application 222 using the touch interface device 216 of the client 110. The touch interface device 216 is a combined input/output device 216, such that it includes a display and touch input interface. In certain aspects, the touch interface device 216 provides touch sensitivity across the entire display of the client 110. In certain aspects, the touch interface device 216 is limited to a touch-sensitive area that frame the display of the client 110, such that the touch input features described herein are limited to the touch-sensitive area framing the display of the client 110. The touch interface device 216 can be, for example, a touchscreen or a touchpad. Alternatively, the client 110 can include a separate input device, such as a keyboard or mouse, and an output device. The client copies of the documents 224b can be obtained over the network 150 from the processor 236 of the server 130 using server copies of the documents 224a stored in the memory 232 of the server 130. Although the server copies of the documents 224a are illustrated as being stored on one server 130, they can also be stored on many different servers.

The processor 212 of the client 110 is configured to execute instructions, such as instructions physically coded into the processor 212, instructions received from software in memory 240, or a combination of both. For example, the processor 212 of the client 110 executes instructions from the application 222 to receive an input of a touch gesture that includes a dragging motion via the touch interface device 216 of the client 110. The touch gesture can be received, for example, when at least one of the documents 224b is provided for display in a tabbed window from a perspective in front of the tabbed window (e.g., in browsing mode).

The processor 212 is also configured to determine whether the touch gesture begins within a predetermined distance from a first edge of the touch interface device 216 and proceeds towards a second edge of the touch interface device 216. The first and second edges can include any edge of the client 110, such as neighboring edges or opposing edges. The touch gesture can be along a substantially straight path or along a curved or other shape path. In certain aspects, the touch gesture can proceed in any direction and the tab switching mode can be entered if the dragging motion of the touch gesture exceeds a predetermined length.

The dragging motion can begin in an input area defined in the application 222 displayed on the touch interface device 216 between the first edge of the touch interface device 216, a predefined distance from the first edge of the touch interface device 216, and the lateral height (e.g., the vertical length) of the touch interface device 216 (within the application 222). The input can be configured to be received at or near any edge of the touch interface device 216. When, for example, the input is configured to be at a lateral edge of the touch interface device 216, then the input dragging motion can begin by moving from off of one edge of the touch interface device 216 (e.g., on a frame that borders the touch interface device 216) back onto the touch interface device 216 in the direction of another edge of the touch interface device 216.

A touch gesture received within the input area within the application 222 can be used by the processor 212 for entering a tab switching mode in the application 222 to switch between a display of tabbed windows of client copies of documents 224 on the client 110. A touch gesture received outside the input area within the application 222 can be used by the processor 212 for interacting with the currently displayed open document 224b in the application 222. For example, during the dragging motion of the touch gesture, one of the several open documents 224b to which the application 222 can be switched to is provided for display. The display can be a screenshot (e.g., in JPEG format) of the opened document 224b that was captured the last time the opened document 224b was displayed in the web browser 222, and the captured screenshot for each opened document 224b can be displayed upon entering the tab switching mode.

The processor 212 is further configured to provide at least one tabbed window in an application for display from a perspective vertically above the tabbed window (e.g., in the tab switching mode) in response to determining that the touch gesture that includes the dragging motion begins within the predetermined distance from the first edge and proceeds towards the second edge. In certain aspects, the tab switching mode is entered if the dragging motion meets or exceeds a threshold length.

One or many tabbed windows for the open documents 224b can be displayed from a perspective vertically above the tabbed windows in the tab switching mode. In cases with multiple tabbed windows being displayed in tab switching mode, a distance between the initial tabbed window that was being viewed when entering tab switching mode and any other tabbed window (e.g., such as a tabbed window being displayed in front of the initial tabbed window) can by default be greater than a distance between each of the remaining tabbed windows being displayed.

In certain aspects, a visual transition can be provided for display when entering the tab switching mode from browsing mode, and from exiting tab switching mode into browsing mode. For example, the visual transition can include a transition from a perspective in front of a currently viewed tabbed window that is zoomed out and pivoted to the perspective vertically above the tabbed window in response to receiving the input of the touch gesture. The visual transition can be animated by, for example, having a viewpoint of the display appear as though it moves from directly in front of the currently viewed tab window to above and slightly in front of the tab window and any other tab windows. The tabbed windows can be displayed at varying degrees with respect to the perspective vertically above the tabbed windows, for example, as if each tabbed window were attached along the bottom of each tabbed window to a shared rotating spindle.

A distance between two tabbed windows can be increased in response to a received multi-touch gesture input or physical movement of the client 110 (e.g., using an accelerometer or other motion detector in the client 110). For example, a user may place a finger on a first tabbed window and a thumb on a second tabbed window and move the finger and thumb further apart in order to create more space between the first and second tabbed windows so that the first tabbed window can be better viewed. As another example, if the user is holding a client 110 that is a tablet computer while in tab switching mode, and the user then rotates the top of the tablet computer slightly away from the user, then more space between the first and second tabbed windows is created so that the first tabbed window can be better viewed.

Figure 3:
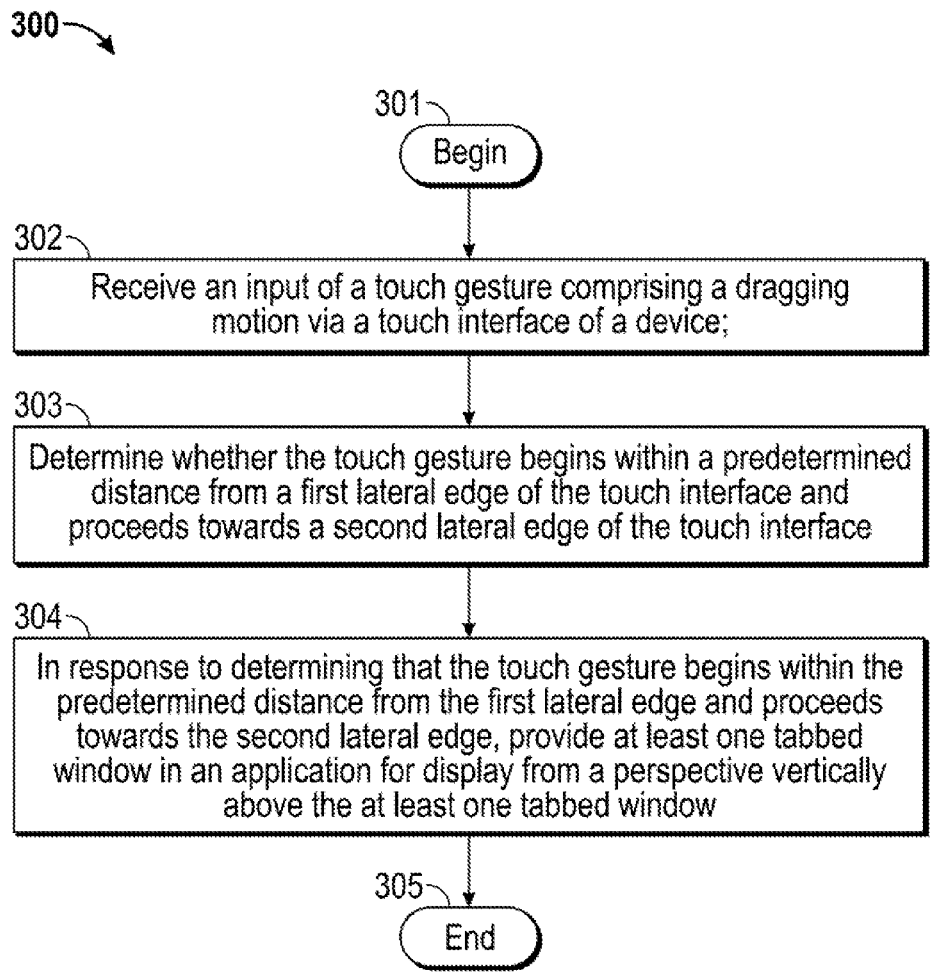
FIG. 3 illustrates an example process for switching between tabbed windows using an example client of FIG. 2.

FIG. 3 illustrates an example process 300 for switching between tabbed windows using the example client 110 of FIG. 2. While FIG. 3 is described with reference to FIG. 2, it should be noted that the process steps of FIG. 3 may be performed by other systems. The process 300 begins by proceeding from beginning step 301 when an application 222 is opened on the client 110 to step 302 when an input of a touch gesture including a dragging motion is received via the touch interface device 216. Next, in step 303, a determination is made whether the touch gesture begins within a predetermined distance from a first edge of the touch interface device 216 and proceeds towards a second edge of the touch interface device 216. In step 304, in response to determining that the touch gesture begins within the predetermined distance from the first edge and proceeds towards the second edge, at least one tabbed window in an application 222 is provided for display on the touch interface device 216 from a perspective vertically above the at least one tabbed window. The process 300 ends in step 305.

FIG. 3 sets forth an example process 300 for switching between tabbed windows using the example client 110 of FIG. 2. An example will now be described using the example process 300 of FIG. 3, a client 110 that is a tablet computer, an application 222 that is a web browser, and documents 224b that are web pages.

Figure 4A:
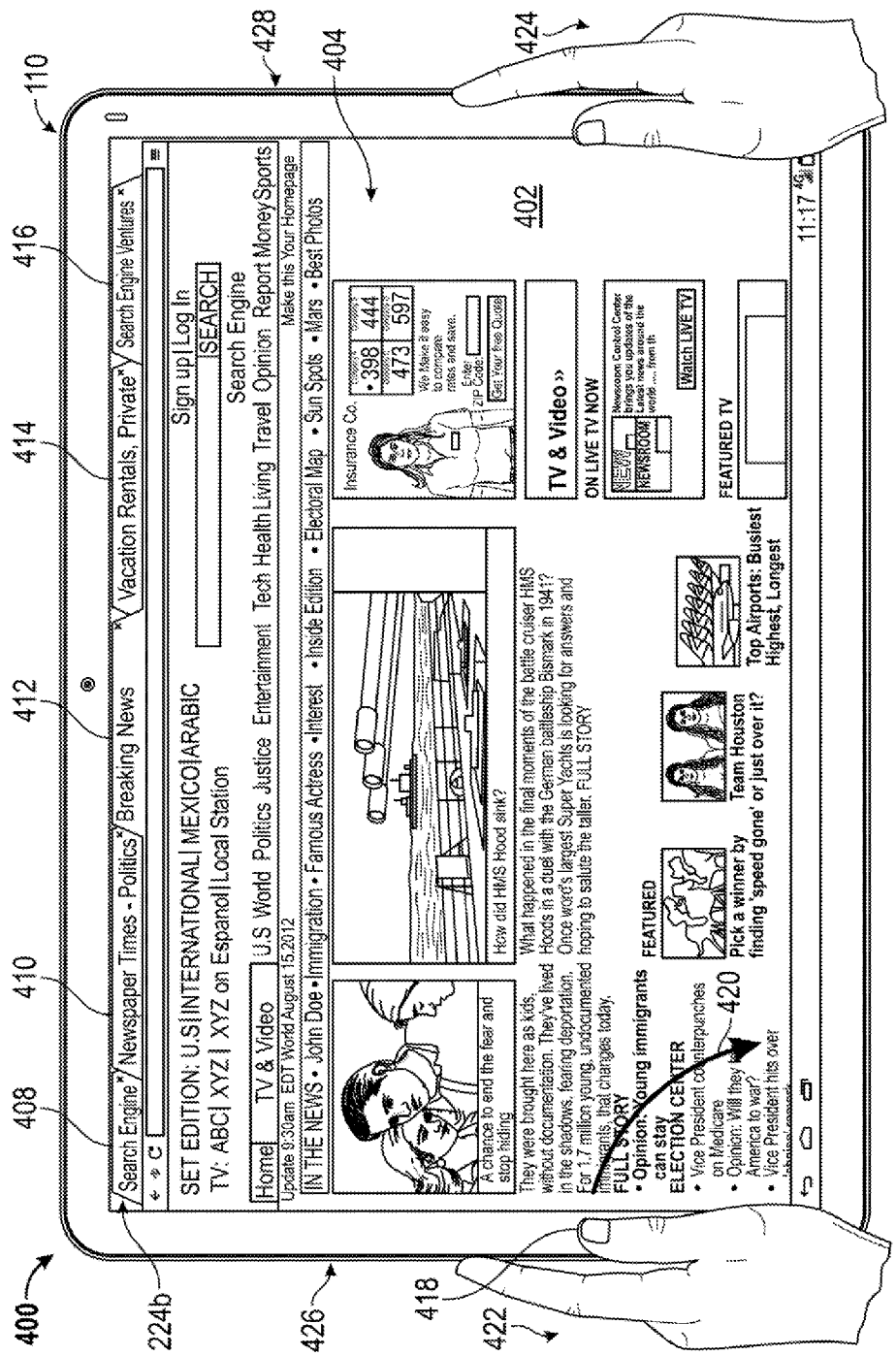
FIGS. 4A-4E are example illustrations associated with the example process of FIG. 3.

As provided in the example illustration 400 of FIG. 4A, the process 300 begins by proceeding from beginning step 301 when a web browser 222 is opened on the tablet computer 110 and several web pages 224b are displayed as tabbed windows 408, 410, 412, 414, and 416 in the web browser 222. The user is holding the tablet computer 110 with the user's left hand 422 and right hand 424.

Figure 4B:
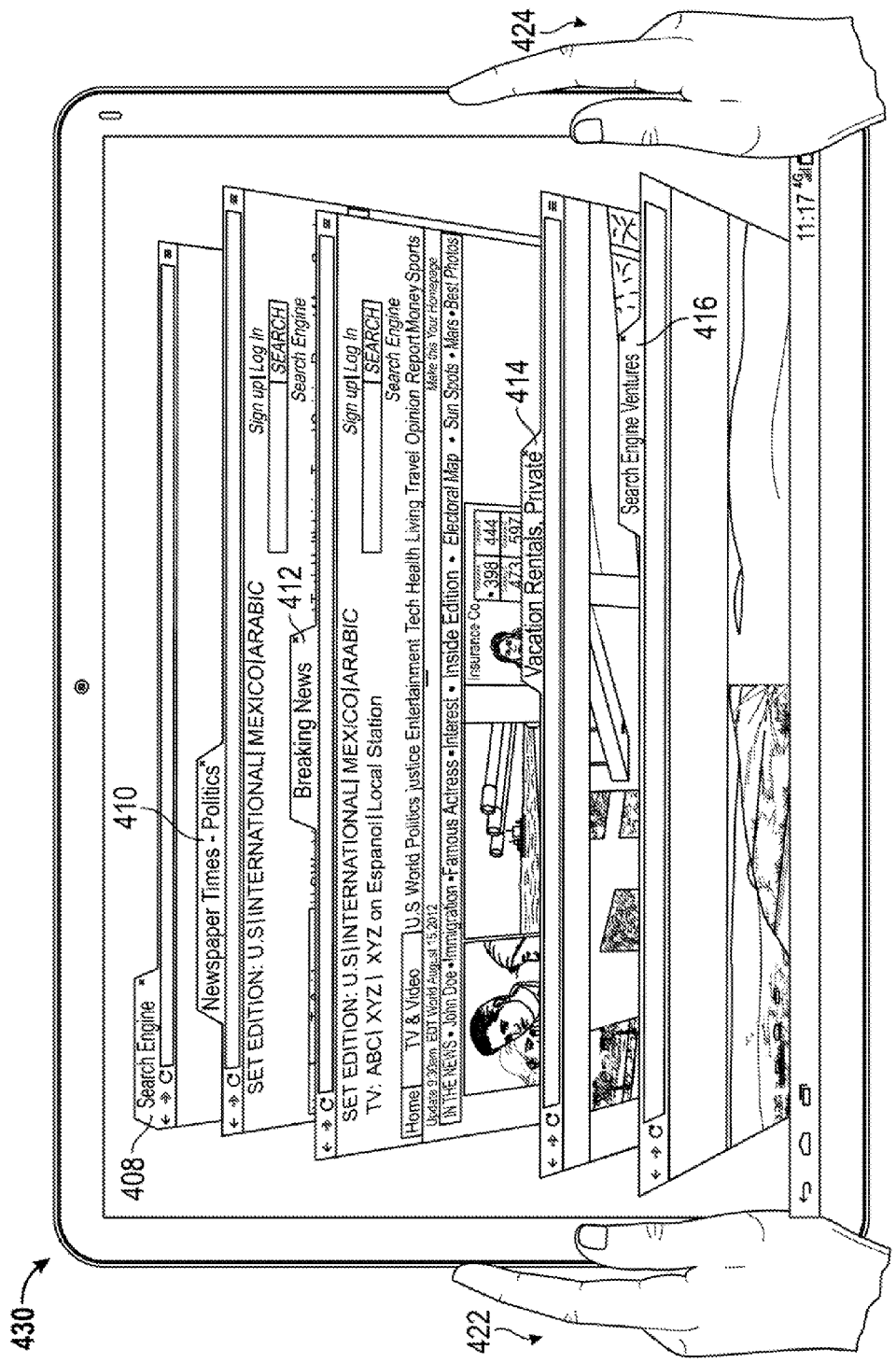

In step 302, an input of a touch gesture 418 from the user's left hand 422 including a dragging motion 420 is received on the tablet computer 110. Next, in step 303, a determination is made whether the touch gesture 420 begins within a predetermined distance from a first edge of the touch interface device 216 (e.g., near the left edge 426 or right edge 428 of the tablet computer 110) and proceeds towards a second edge of the touch interface device 216. In this case, it is determined that the touch gesture 420 begins within the predetermined distance from the left edge 426 of the touch interface device 216 and proceeds towards the second edge 428 of the touch interface device 216. In step 304 and as provided in the example illustration 430 of FIG. 4B, in response to determining that the touch gesture 418 begins within the predetermined distance from the left edge 426 and proceeds towards the right edge 428, a tab switching mode is entered in the web browser 222 such that each of the tabbed windows 408, 410, 412, 414, and 416 in the web browser 222 are provided for display on the tablet computer 110 from a perspective vertically above the tabbed windows 408, 410, 412, 414, and 416.

The tabbed windows 408, 410, 412, 414, and 416 are displayed at varying degrees with respect to the perspective vertically above the tabbed windows 408, 410, 412, 414, and 416, for example, as if each tabbed window 408, 410, 412, 414, and 416 were attached along the bottom of each tabbed window 408, 410, 412, 414, and 416 to a shared rotating spindle. The distance between the currently displayed tabbed window 412 that was being viewed as illustrated in FIG. 4A when entering tab switching mode and the other tabbed windows 408, 410, 414, and 416 and the tabbed window 414 being displayed in front of the currently displayed tabbed window 412 is greater than a distance between each of the remaining tabbed windows 408, 410, and 416 being displayed so that the currently displayed tabbed window 412 remains most visible in the tab switching mode illustrated in FIG. 4B.

Figure 4C:
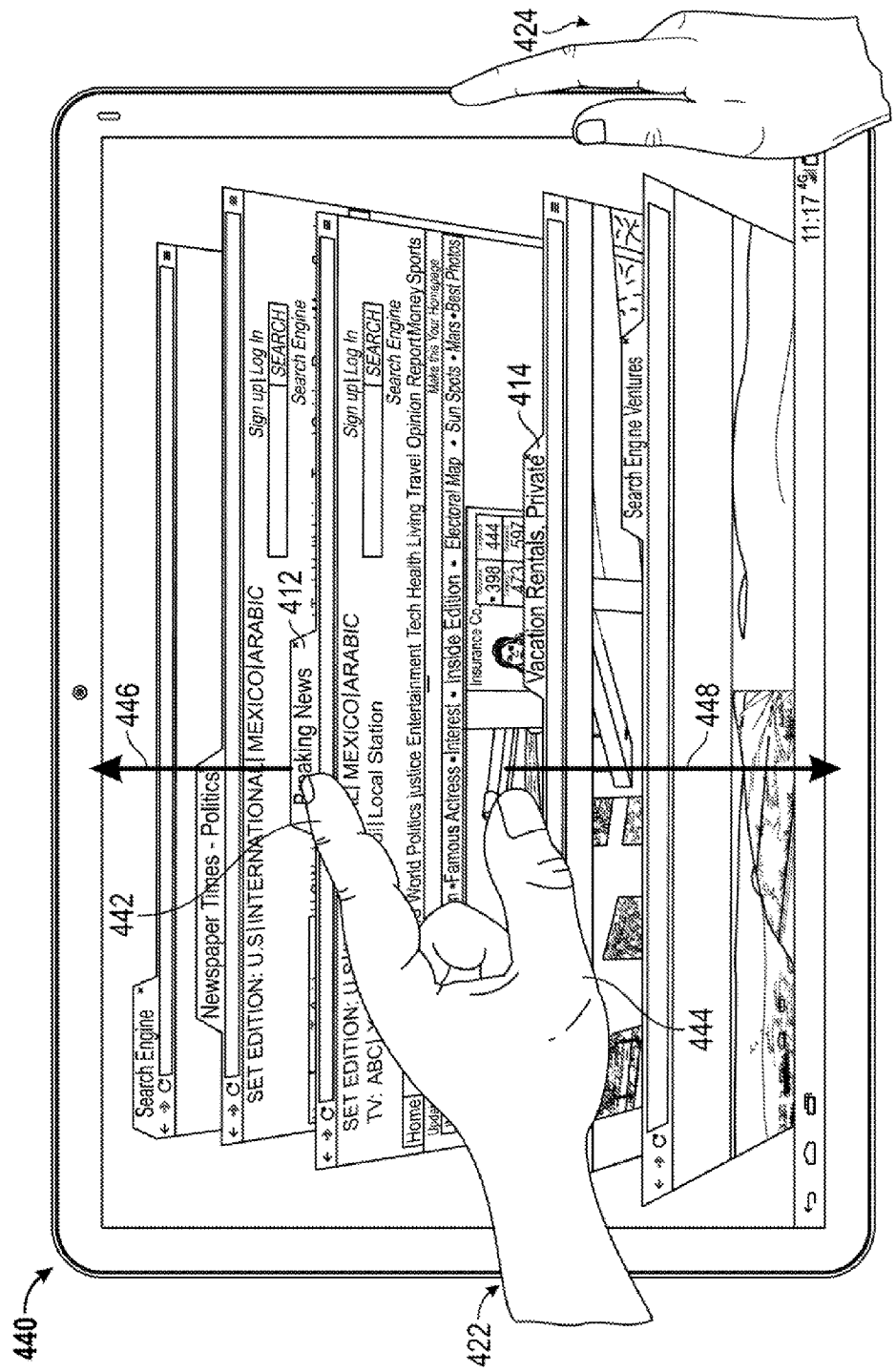
Figure 4D:
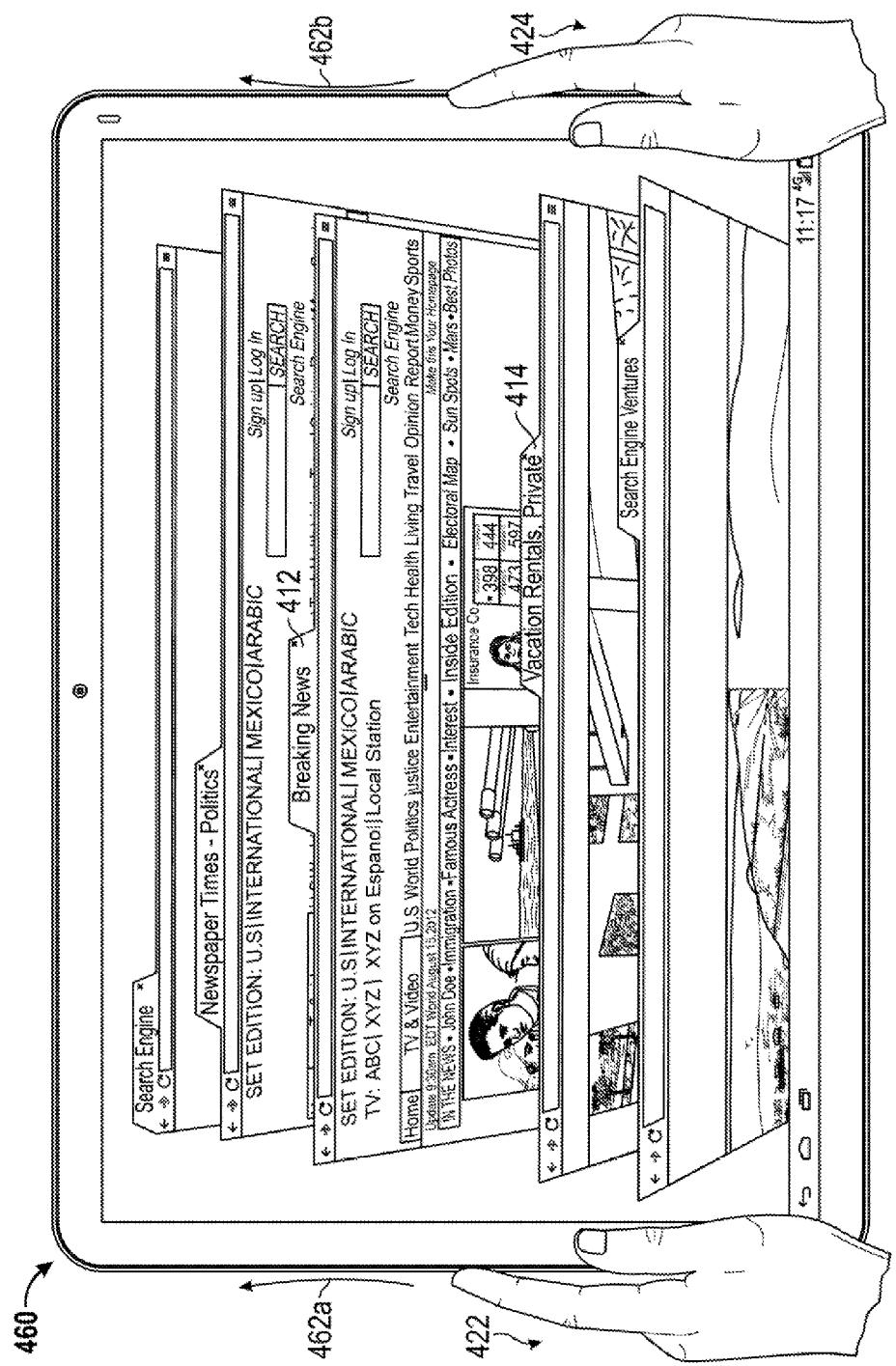
Figure 4E:
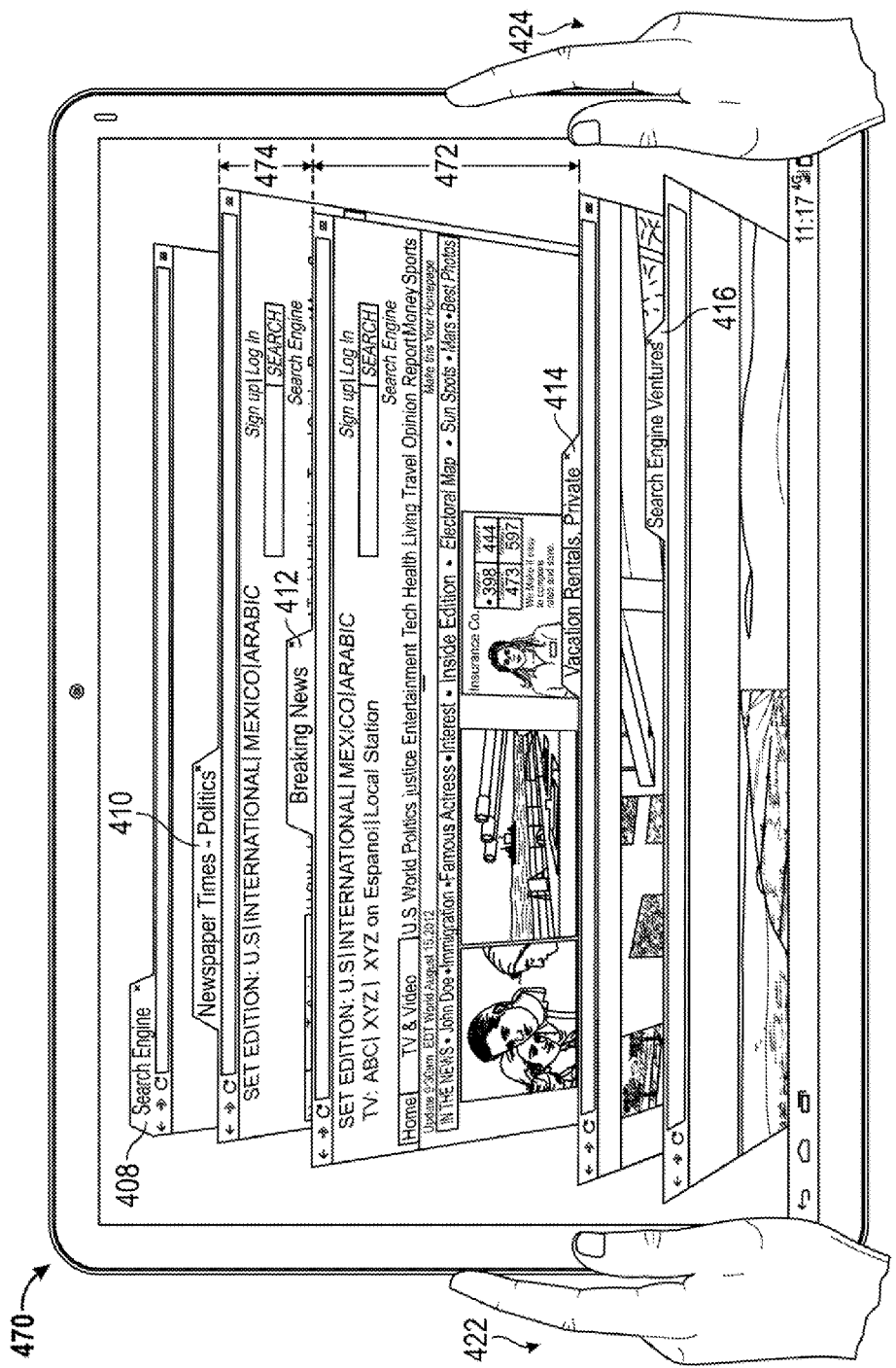

As discussed above, the distance between two of the tabbed windows 408, 410, 412, 414, and 416 can be increased in response to a received multi-touch gesture input or physical movement of the client 110. For example, as provided in the example illustration 440 of FIG. 4C, the user may place a finger 442 on a first tabbed window 412 and a thumb on a second tabbed window 414 and move the finger and thumb further apart in opposing directions 446 and 448 in order to create more space between the first tabbed window 412 and the second tabbed window 448 so that the first tabbed window can be better viewed. As another example, and as provided in the example illustration 460 of FIG. 4D, if the user is holding the tablet computer 110 while in tab switching mode, and the user then rotates the tablet computer 110 along paths 462a and 462b for both edges slightly away from the user, which is sensed by an accelerometer within the tablet computer 110, then more space between the first tabbed window 412 and the second tabbed window 414 can be created so that the first tabbed window 412 can be better viewed. The example illustration 470 of FIG. 4E illustrates an increase in space 472 between the first tabbed window 412 and the second tabbed window 414 in response to the multi-touch gesture of FIG. 4C or the movement of the tablet computer 110 in FIG. 4D and a decrease in space 474 between other tabbed windows 410 and 412. The process 300 ends in step 305.

Figure 5:
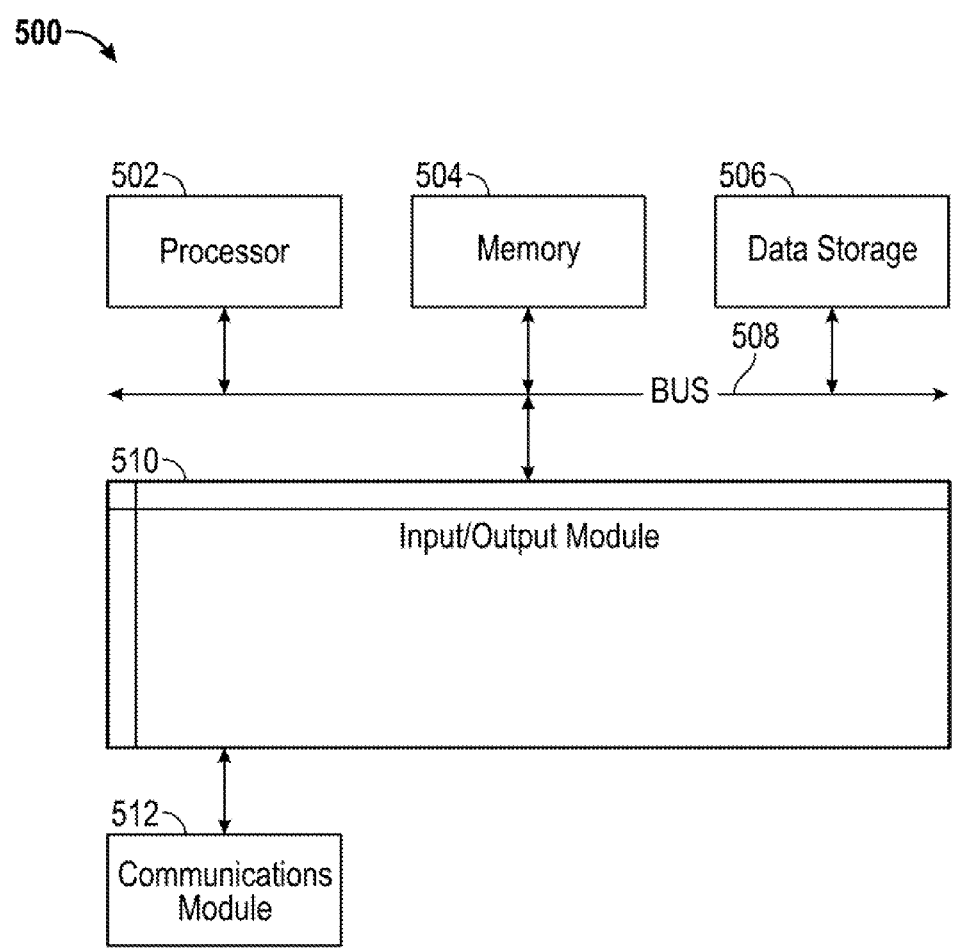
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., touch interface device 216) and/or an output device 516 (e.g., touch interface device 216). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

These and other implementations are within the scope of the following claims.

What is claimed is:

1. A computer-implemented method for switching between tabbed windows, the method comprising:
  receiving an input of a touch gesture comprising a dragging motion via a touch interface of a device;
  determining whether the touch gesture begins within a predetermined distance from a first edge of the touch interface and proceeds towards a second edge of the touch interface; and
  in response to determining that the touch gesture begins within the predetermined distance from the first edge and proceeds towards the second edge, providing a plurality of tabbed windows in an application for display from a perspective vertically above the plurality of tabbed windows, and
  wherein each of the plurality of tabbed windows is configured to be provided for display along a respective plane, and wherein each of the respective planes corresponding to the plurality of tabbed windows is angled at a different degree with respect to the perspective vertically above the plurality of tabbed windows than the remaining respective planes corresponding to the remaining plurality of tabbed windows.

2. The method of claim 1, wherein the touch gesture is received when the at least one tabbed window is provided for display from a perspective in front of the at least one tabbed window.

3. The method of claim 2, further comprising providing, for display, a visual transition from the perspective in front of the at least one tabbed window to the perspective vertically above the at least one tabbed window in response to receiving the input of the touch gesture.

4. The method of claim 1, wherein the touch gesture is received when the at least one tabbed window is provided for display from a perspective in front of the at least one tabbed window, and wherein a distance between the at least one tabbed window and at least one other tabbed window from among the plurality of tabbed windows is greater than a distance between each of the remaining tabbed windows from the plurality of tabbed windows.

5. The method of claim 1, wherein the dragging motion is received for a length, and wherein the providing at least one tabbed window for display from a perspective vertically above the at least one tabbed window is further in response to determining that the length of the dragging motion exceeds a threshold length.

6. The method of claim 1, wherein the touch interface comprises at least one of a touchscreen or touchpad.

7. The method of claim 1, wherein a distance between at least two adjacent tabbed windows from among the plurality of tabbed windows is configured to be increased in response to at least one of a received multi-touch gesture input or a physical movement of the device.

8. A system for switching between tabbed windows, the method comprising:
  a memory comprising instructions; and
  a processor configured to execute the instructions to:
    receive an input of a touch gesture comprising a dragging motion via a touch interface of a device;
    determine whether the touch gesture begins within a predetermined distance from a first edge of the touch interface and proceeds towards a second edge of the touch interface; and
    in response to determining that the touch gesture begins within the predetermined distance from the first edge and proceeds towards the second edge, provide a plurality of tabbed windows in an application for display from a perspective vertically above the plurality of tabbed windows,
    wherein each of the plurality of tabbed windows is configured to be provided for display along a respective plane, and wherein each of the respective planes corresponding to the plurality of tabbed windows is angled at a different degree with respect to the perspective vertically above the plurality of tabbed windows than the remaining respective planes corresponding to the remaining plurality of tabbed windows.

9. The system of claim 8, wherein the touch gesture is received when at least one tabbed window from the plurality of tabbed windows is provided for display from a perspective in front of the at least one tabbed window.

10. The system of claim 9, further comprising providing, for display, a visual transition from the perspective in front of the at least one tabbed window to the perspective vertically above the plurality of tabbed windows in response to receiving the input of the touch gesture.

11. The method of claim 8, wherein the touch gesture is received when the at least one tabbed window is provided for display from a perspective in front of the at least one tabbed window, and wherein a distance between the at least one tabbed window and at least one other tabbed window from among the plurality of tabbed windows is greater than a distance between each of the remaining tabbed windows from the plurality of tabbed windows.

12. The system of claim 8, wherein the dragging motion is received for a length, and wherein the providing the plurality of tabbed windows for display from a perspective vertically above the plurality of tabbed windows is further in response to determining that the length of the dragging motion exceeds a threshold length.

13. The system of claim 8, wherein the touch interface comprises a touchscreen.

14. The system of claim 8, wherein the touch interface comprises a touchpad.

15. The system of claim 8, wherein a distance between at least two adjacent tabbed windows from among the plurality of tabbed windows is configured to be increased in response to at least one of a received multi-touch gesture input or a physical movement of the device.

16. A non-transitory machine-readable storage medium comprising machine-readable instructions for causing a processor to execute a method for switching between tabbed windows, comprising:
  receiving an input of a touch gesture comprising a dragging motion via a touch interface of a device when at least one tabbed window from among a plurality of tabbed windows is provided for display from a perspective in front of the at least one tabbed window;
  determining whether the touch gesture begins within a predetermined distance from a first edge of the touch interface and proceeds towards a second edge of the touch interface; and
  in response to determining that the touch gesture begins within the predetermined distance from the first edge and proceeds towards the second edge, providing the plurality of tabbed windows in a web browser for display from a perspective vertically above the plurality of tabbed windows, each of the plurality of tabbed windows being provided for display along a respective plane, and wherein each of the respective planes corresponding to the plurality of tabbed windows is angled at a different degree with respect to the perspective vertically above the plurality of tabbed windows than the remaining respective planes corresponding to the remaining plurality of tabbed windows,
  wherein the touch interface comprises at least one of a touchscreen or a touchpad.

\* \* \* \* \*